United States Patent
Moser et al.

(10) Patent No.: US 12,438,469 B2
(45) Date of Patent: Oct. 7, 2025

(54) SWITCHED-MODE POWER SUPPLY HAVING COUPLED STEP-DOWN CONVERTER STAGES

(71) Applicant: Phoenix Contact GmbH & Co. KG, Blomberg (DE)

(72) Inventors: Alexander Moser, Werl (DE); Thomas Sprink, Salzkotten (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 595 days.

(21) Appl. No.: 17/311,083

(22) PCT Filed: Nov. 18, 2019

(86) PCT No.: PCT/EP2019/081624
§ 371 (c)(1),
(2) Date: Nov. 10, 2021

(87) PCT Pub. No.: WO2020/114758
PCT Pub. Date: Jun. 11, 2020

(65) Prior Publication Data
US 2022/0181979 A1    Jun. 9, 2022

(30) Foreign Application Priority Data
Dec. 5, 2018    (BE) .................... 2018/5855

(51) Int. Cl.
*H02M 3/335*    (2006.01)
*H02M 1/00*    (2006.01)
*H02M 3/158*    (2006.01)

(52) U.S. Cl.
CPC ..... *H02M 3/33569* (2013.01); *H02M 1/0074* (2021.05); *H02M 1/0077* (2021.05); *H02M 3/158* (2013.01); *H02M 1/007* (2021.05)

(58) Field of Classification Search
CPC ............. H02M 1/0067–0077; H02M 3/33523
See application file for complete search history.

(56) References Cited

U.S. PATENT DOCUMENTS

| | | | |
|---|---|---|---|
| 5,278,492 A * | 1/1994 | Huynh ................. | C01B 13/115 363/124 |
| 5,932,995 A | 8/1999 | Wagoner | |

(Continued)

FOREIGN PATENT DOCUMENTS

| | | |
|---|---|---|
| CN | 1732614 A | 2/2006 |
| CN | 105356758 A | 2/2016 |

(Continued)

OTHER PUBLICATIONS

Baoxing Chen et al. "Technical Article Integration of Isolation for Grid-Tied Photovoltaic Inverters"; Jul. 1, 2012 (Jul. 1, 2012), Retrieved from the Internet: https :/www.analog.com/media/en/technical-document_ation/tech-articles/integration-of-isolation-for-grid-tied-photovoltaic-inverters-ms-2356.pdf; [retrieved on Jul. 17, 2019]; XP055606344 abstract; figures 1-5; 5 pgs.

(Continued)

*Primary Examiner* — Peter M Novak
(74) *Attorney, Agent, or Firm* — Holland & Hart LLP

(57) ABSTRACT

A switched mode power supply includes an input circuit powered by an input voltage, wherein the input voltage is based on a voltage difference between a positive input voltage and a negative input voltage; an output circuit coupled to the input circuit and configured to provide an output voltage, and a direct current isolating element between the input circuit and the output circuit and configured to observe a prescribed safety requirement with regard to isolation between the input voltage and the output voltage. The input circuit has two coupled step-down converter stages, including a first step-down converter stage configured to step down the positive input voltage and a second (Continued)

step-down converter stage configured to step down the negative input voltage. The two coupled step-down converter stages are connected to the input circuit upstream of the DC isolating element.

12 Claims, 8 Drawing Sheets

(56) References Cited

U.S. PATENT DOCUMENTS

| | | | |
|---|---|---|---|
| 2004/0070994 A1 | 4/2004 | Takagi et al. | |
| 2005/0017699 A1* | 1/2005 | Stanley | G05F 1/70 323/282 |
| 2013/0063039 A1* | 3/2013 | Hwang | H05B 45/385 315/223 |
| 2014/0111005 A1 | 4/2014 | Liu et al. | |
| 2014/0191745 A1* | 7/2014 | Mari Curbelo | G05F 3/08 323/311 |
| 2015/0180355 A1 | 6/2015 | Freeman et al. | |
| 2015/0207426 A1* | 7/2015 | Santini | H02M 3/158 363/126 |
| 2015/0357922 A1* | 12/2015 | Lai | H02M 3/3376 363/21.02 |
| 2016/0006365 A1 | 1/2016 | Perreault et al. | |

FOREIGN PATENT DOCUMENTS

| | | |
|---|---|---|
| CN | 105743344 A | 7/2016 |
| CN | 105934876 A | 9/2016 |
| DE | 197 00 100 A1 | 7/1998 |
| DE | 10 2007 034 450 A1 | 1/2008 |
| DE | 10 2016 123 678 A1 | 6/2018 |
| JP | 2008 187817 A | 8/2008 |
| WO | WO 2013/086445 A1 | 6/2013 |
| WO | WO 2014/168911 A1 | 10/2014 |

OTHER PUBLICATIONS

Qian et al., "Input-Series Two-Stage DC-DC Converter with Inductor Coupling", Northeastern University, Dept. of Electrical & Computer Engineering, Boston MA 02115 USA, IEEE 2007, 5 pages.
Park et al., "Quasi-Resonant (QR) Controller With Adaptive Switching Frequency Reduction Scheme For Flyback Converter", IEEE Transactions On Industrial Electronics, vol. 63, No. 6, Jun. 2016, 12 pages.
Walker, et al., "An Isolated MOSFET gate driver", Jan. 1, 1996, Seiten 1-7, XP093148673, Gefunden im Internet: URL:https://eprints.qut.edu.au/63591/fetdrvr-t.pdf [gefunden am Apr. 5, 2024].
The Van Nguyen et al., "Design and Investigation of an Isolated Gate Driver Using CMOS Integrated Circuit and HF Transformer for Interleaved DC/DC Converter", IEEE Transactions on Industry Applications, IEEE Service Center, Piscataway, NJ, US, Bd. 49, Nr. 1, Jan. 1, 2013, Seiten 189-197, XP011487590, ISSN: 0093-9994, doi: 10.1109/TIA.2012.2229254.

* cited by examiner

SWITCHED-MODE POWER SUPPLY HAVING COUPLED STEP-DOWN CONVERTER STAGES

CROSS-REFERENCE TO RELATED APPLICATIONS

The present application is the national phase entry under 35 U.S.C. 371 of International Patent Application No. PCT/EP2019/081624 by Moser et al., entitled "SWITCHED-MODE POWER SUPPLY HAVING COUPLED STEP-DOWN CONVERTER STAGES," filed Nov. 18, 2019, and claims the benefit of Belgian Patent Application No. BE2018/5855 by Moser et al., entitled "SCHALTNETZTEIL MIT GEKOPPELTEN TIEFSETZERSTUFEN," filed Dec. 5, 2018, each of which is assigned to the assignee hereof and is incorporated by reference in its entirety.

FIELD OF THE DISCLOSURE

This disclosure relates to a galvanically isolated switched-mode power supply with two coupled step-down converter stages to reduce the insulation requirements between input voltage and output voltage.

BACKGROUND

In the area of safe isolation, power supplies have the task of adapting the voltage to the respective consumer. Depending on the supplying source, the input voltage in the hazardous area is above a certain voltage limit. For example, an industrial control cabinet is usually supplied with a dangerous contact voltage of 120 VAC or 230 VAC or a low voltage of up to 1000 VAC/1500 VDC. For this purpose, requirements for electrical safety such as insulation distances or materials or contact protection must be observed. The consumers in the control cabinet, such as a control (SPS) or sensors or actuators, are powered by a touchable safety extra low voltage (SELV) so that they do not have to implement any special requirements for electrical safety in the consumer or its connections.

It is therefore also the task of a power supply to safely separate the dangerous contact input voltage from the accessible output voltage.

For this purpose, normative requirements for minimum clearances and creepage distances (LuK) for the separation between the dangerous contact input voltage and the accessible output voltage are set within a power supply according to the respective application. Basic requirements for air and creepage distances are defined, for example, in the IEC 60664 series of standards: "Insulation coordination for electrical equipment in low-voltage systems". Depending on the product and the application, the respective product standards such as IEC 62109: "Safety of inverters for use in photovoltaic energy systems", IEC 60950: "Information technology equipment—safety" or IEC 61010: "Safety regulations for electrical measuring, control, regulating and laboratory equipment" or IEC62368: "Equipment for audio/video, information and communication technology—Part 1: Safety Requirements" are decisive.

SUMMARY

An improved switched-mode power supply with reduced insulation requirements is described herein.

By expanding the basic circuit concept as described herein, the insulation requirements over the isolating distance may be significantly reduced. The insulation voltages across the components of the isolating distance may be reduced regardless of the grounding of the input and output voltages.

This improved switched-mode power supply is achieved by the objects with the features according to the independent claims. Advantageous examples are the subject of the dependent claims, the description, and the drawings.

A basic concept of the present disclosure is to connect a step-down converter upstream of a galvanically isolating DC/DC converter in both positive and negative input voltage causing is a voltage drops across two step-down converter stages, as a result of which the insulation voltage across an isolating distance $V_{IS1}$ is reduced independently of the grounding. It is advantageous to combine or couple the coils of the two step-down converter circuits and wind them on a ferrite core, as a result of which the two step-down converter stages are automatically symmetrized and tolerances between the coils are irrelevant. Simultaneous control of the circuit breakers of the two step-down converters is therefore necessary.

According to a first aspect, a switched-mode power supply includes: an input circuit powered by an input voltage; an output circuit coupled to the input circuit for providing an output voltage; and a DC isolating element between the input circuit and the output circuit, which isolating element is designed to observe a prescribed safety requirement with regard to isolation between the input voltage and the output voltage, wherein the input circuit comprises two coupled step-down converter stages, of which a first step-down converter stage in the positive input voltage and a second step-down converter stage in the negative input voltage are connected upstream of the DC isolating element.

With such a switched-mode power supply, the technical advantage is achieved that there is a voltage drop across the two step-down converter stages, as a result of which the insulation voltage across the isolating distance is reduced independently of the grounding.

In an advantageous example of the switched-mode power supply, the two step-down converter stages are designed to cause a voltage drop in the input voltage and thus to reduce an insulation voltage across the DC isolating element.

This has the technical advantage that the specified safety requirements with regard to isolation between the input voltage and the output voltage can be met more easily, i.e. the requirements for the DC isolating element can be reduced.

In an advantageous example of the switched-mode power supply, the two step-down converter stages each comprise a coil which is wound on a common core.

This has the technical advantage that the two step-down converter stages are automatically symmetrized and tolerances between the coils are irrelevant.

In an advantageous example of the switched-mode power supply, the two step-down converter stages each include a power switch, a freewheeling diode and the coils coupled via the common core. The freewheeling diodes can also be implemented as power switches.

The similar structure of the two step-down converter stages has the technical advantage that the voltage drop across both step-down converter stages is the same and the insulation requirements over the DC isolating element are always reduced by the corresponding voltage drop.

In an advantageous example of the switched-mode power supply, the two step-down converter stages can be controlled jointly via a control signal.

The joint control of the two step-down converter stages has the technical advantage that the voltage drop across both step-down converter stages is the same and the insulation requirements across the DC isolating element are always reduced by the corresponding voltage drop.

In an advantageous example of the switched-mode power supply, the input circuit comprises a pulse transmitter or a driver circuit which are designed to adapt the control signal of the two step-down converter stages to a reference potential of the two power switches.

In an advantageous example of the switched-mode power supply, the input circuit comprises a control circuit which is designed to generate the control signal, wherein a reference potential of the control circuit is connected to a center tap between the two step-down converter stages.

This has the technical advantage that the input voltage at the control circuit is divided by half, which means that the insulation voltage is reduced to roughly half regardless of the grounding.

In an advantageous example of the switched-mode power supply, the two step-down converter stages are coupled to one another on the input side via two input capacitors connected in series, the center tap of which forms the center tap between the two step-down converter stages.

The input voltage is divided by half by the step-down converter, wherein the capacitors smooth the AC component.

In an advantageous example of the switched-mode power supply, the two input capacitors are connected in series between the positive input voltage and the negative input voltage.

This has the technical advantage that the two input capacitors implement a voltage divider whose center tap is easily accessible.

In an advantageous example of the switched-mode power supply, the two step-down converter stages are coupled to one another on the output side via a single output capacitor.

This has the technical advantage of easier implementation of the step-down converter stages, since no center tap is required on the output side.

In an advantageous example of the switched-mode power supply, the DC isolating element comprises a transformer which can be controlled by the control circuit via a power switch.

By controlling the transformer via the control circuit, whose reference potential is connected to a center tap between the two step-down converter stages, the technical advantage is achieved that the isolation voltage across the transformer is reduced to half of the positive input voltage when grounded at the positive input voltage.

In an advantageous example of the switched-mode power supply, the input circuit comprises a transformer which is connected between the control circuit and the power switch and which galvanically isolates the control circuit from the power switch.

The control signal is adapted to the reference potential of the circuit breaker by a transformer.

In an advantageous example of the switched-mode power supply, the DC isolating element comprises a feedback element for regulating the input circuit, in particular an optocoupler or a magnetic coupler. The optocoupler is controlled by the secondary-side control 202 (see FIG. 2).

The output of the feedback element in the primary-side control circuit and its reference potential is connected to the center tap between the two step-down converter stages, which has the technical advantage that the isolation voltage across the feedback element is reduced by approximately half.

In an advantageous example, the switched-mode power supply is grounded to that of the positive input voltage or to the negative input voltage.

According to a second aspect, a method for reducing the insulation requirement on a switched-mode power supply with an input circuit powered by an input voltage; an output circuit coupled to the input circuit for providing an output voltage; and a DC isolating element between the input circuit and the output circuit, which isolating element is designed to comply with a prescribed safety requirement with regard to isolation between the input voltage and the output voltage, includes: switching two coupled step-down converter stages in the input circuit of the switched-mode power supply, of which a first step-down converter stage in the positive input voltage and a second step-down stage in the negative input voltage is connected upstream of the DC isolating element.

With such a method, the technical advantage is achieved that there is a voltage drop across the two step-down converter stages, as a result of which the isolation voltage across the isolating distance, i.e. the DC isolating element, is reduced regardless of the grounding.

According to a third aspect, a computer program includes a program code for executing such a method when the program code is executed on a computer. The control of the power supply can be implemented in analog or digital form.

BRIEF DESCRIPTION OF THE DRAWINGS

Further examples are explained with reference to the accompanying drawings. They show.

DETAILED DESCRIPTION

Figure 1:
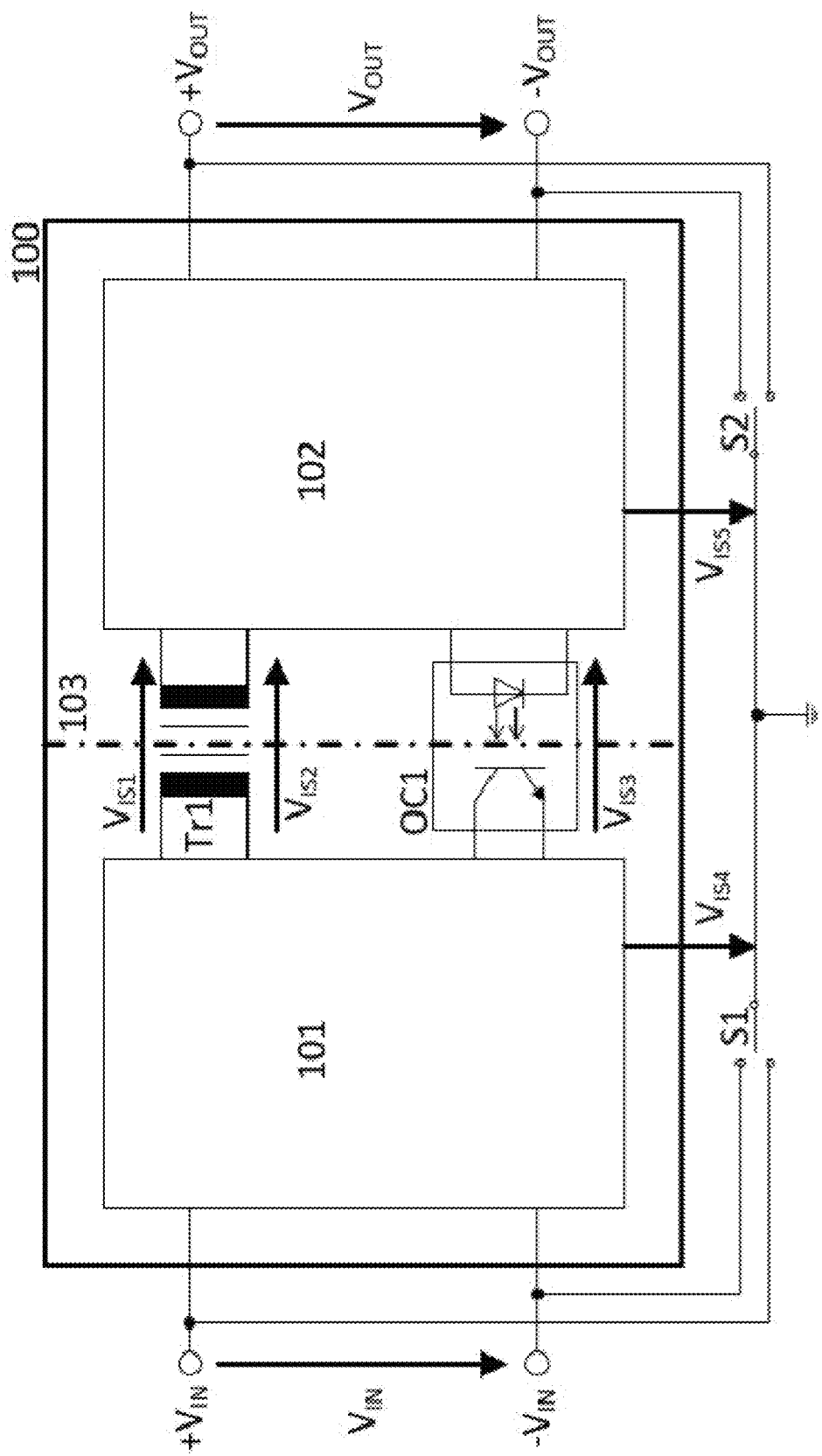
FIG. 1 shows a basic circuit diagram of the insulation in a galvanically isolated power supply 100.

FIG. 1 shows a basic circuit diagram of the isolation in a galvanically isolated power supply 100 and illustrates isolation voltages $V_{IS1}$, $V_{IS2}$ and $V_{IS3}$ occurring over a galvanic isolating distance 103. For this purpose, the switches S1 and S2 are closed and the input voltage $V_{IN}$ and the output voltage $V_{OUT}$ are each grounded at one point. The highest voltage that occurs is usually measured at the maximum input voltage $V_{IN}$ via the isolating distances IS1 . . . IS5.

Figure 2:
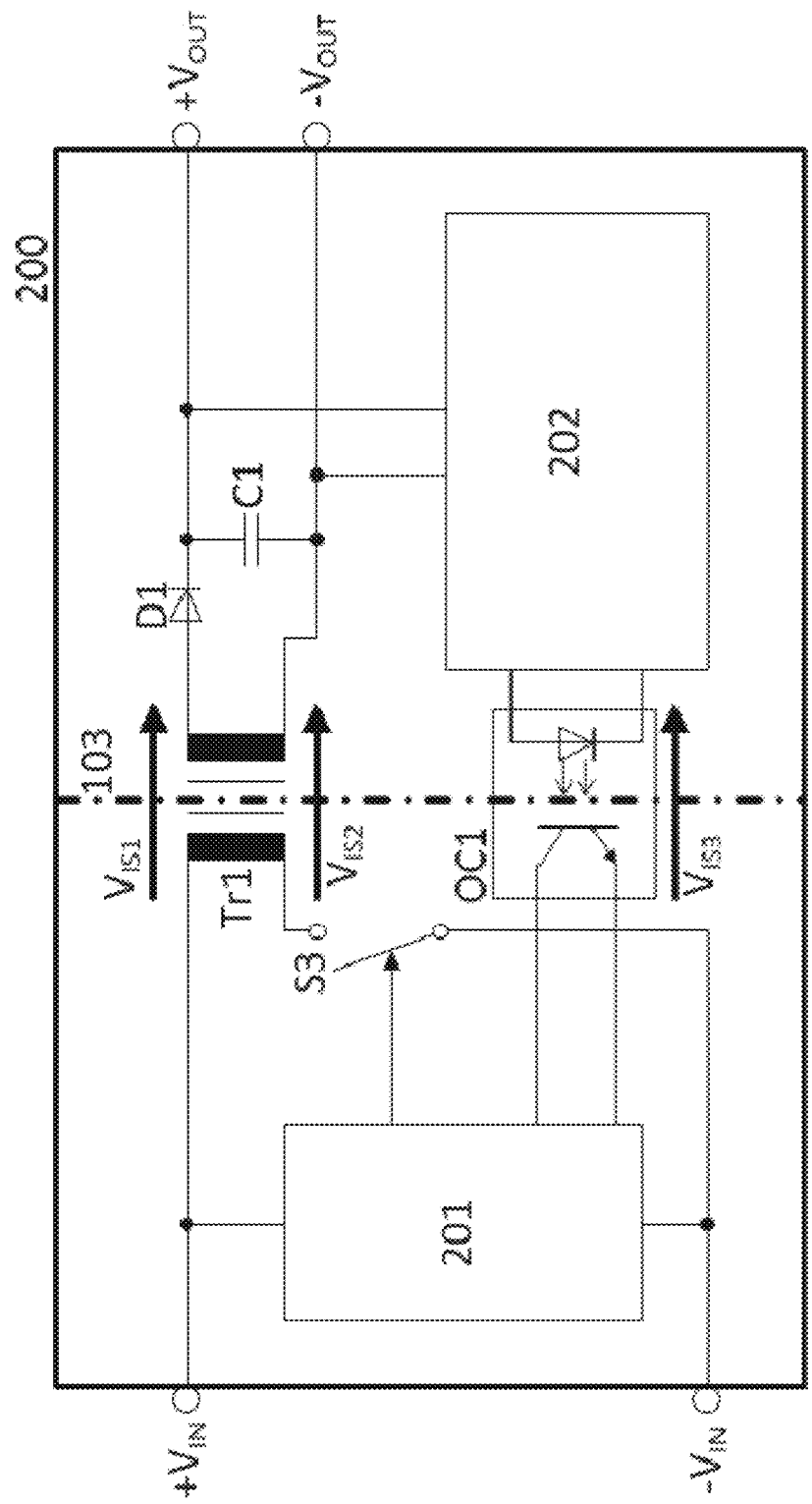
FIG. 2 shows a basic circuit diagram of the insulation in a galvanically separated switched-mode power supply 200.

FIG. 2 shows a basic circuit diagram of the isolation in a galvanically isolated switched-mode power supply 200. Essentially, isolation requirements arise via the transformer Tr1 and via the feedback, i.e. error control of the output variables via the optocoupler OC1. The output variables can be the output voltage or the output current, if necessary, also for several output voltages.

An input-side rectification and smoothing for a switched-mode power supply with AC voltage supply is not shown here, but only the DC/DC converter, which is actually electrically isolating. The basic circuit diagram is also independent of the functionality of the DC/DC converter. This can be implemented according to known basic circuit principles, e.g. implemented as a flyback converter or forward converter or half-bridge or full-bridge or resonance converter. In particular with high input voltages, basic circuit concepts such as 2-transistor converters or a series connection from the above concepts are also used. The control principle used for circuit breaker S3 can, for example, be hard switching with pulse width modulation (PWM) or resonant with frequency modulation (PFM).

Likewise, regardless of the technology used, the power switch S3 can be implemented as a power switch that can be switched on and off as required and can be implemented, for example, as a MOSFET or bipolar transistor or IGBT or GAN-FET or SiC-FET.

Figure 3:
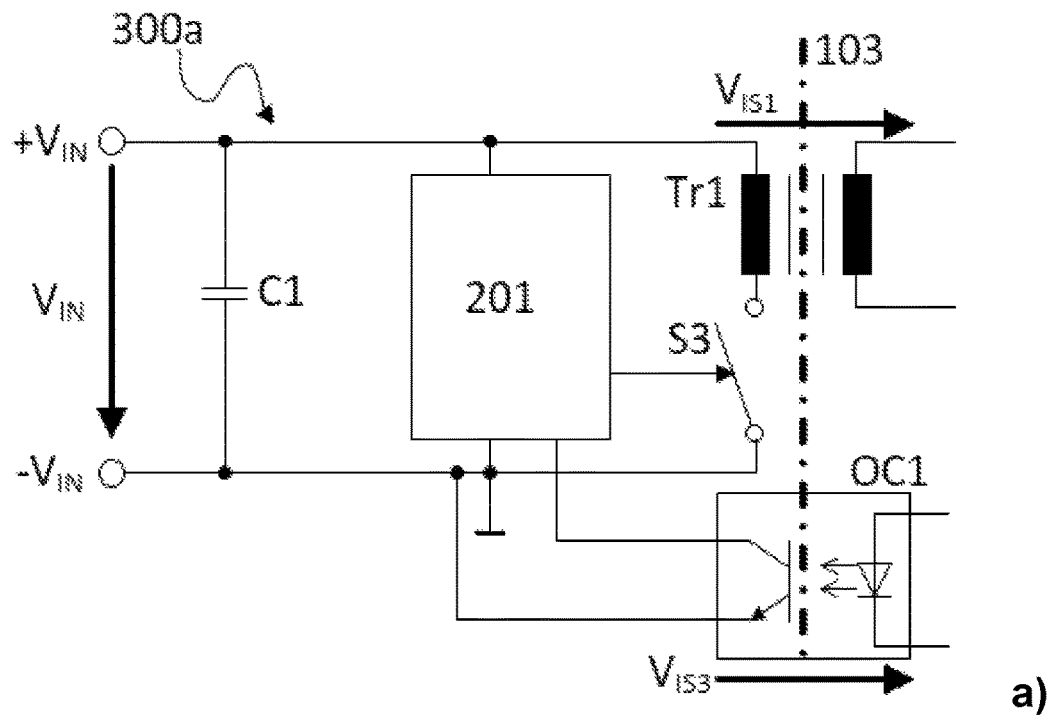
FIG. 3*a/b/c* show schematic circuit diagrams of the reference potential of the primary-side control and of the optocoupler OC1 in a galvanically separated switched-mode power supply 300*a*, 300*b* and a step-down converter 300*c*.
Figure 3:
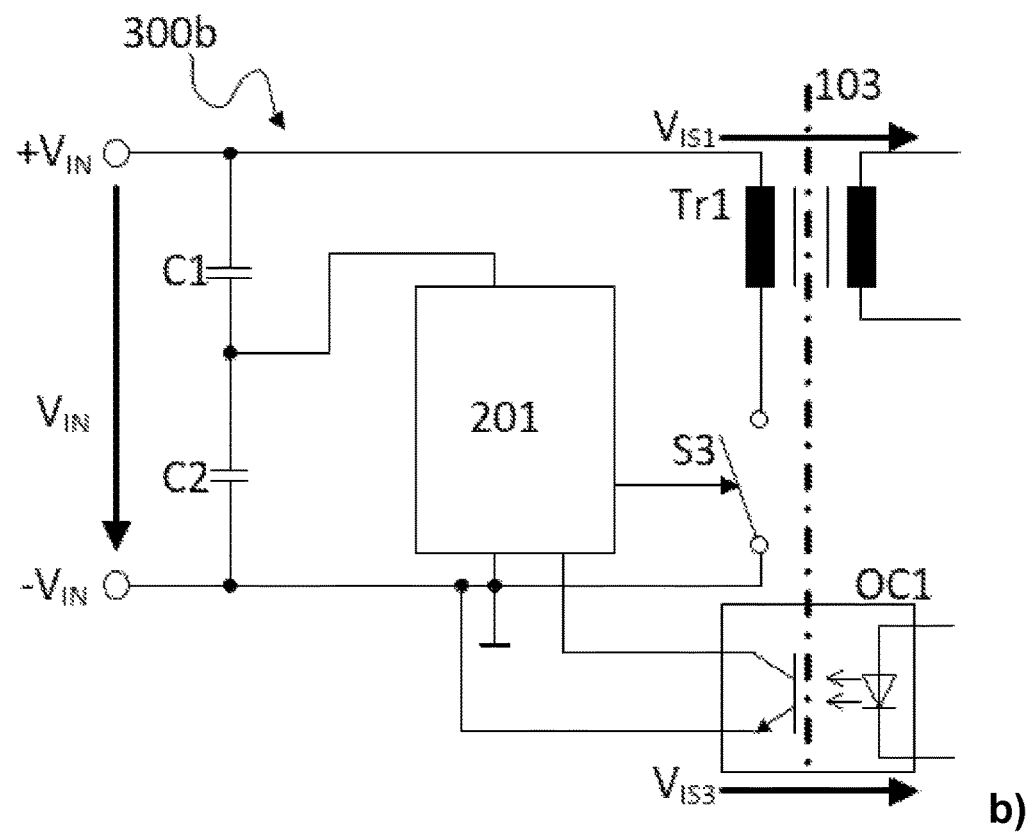

FIGS. 3a and 3b show basic circuit diagrams of the reference potential of the primary-side control and the optocoupler OC1 in a galvanically isolated switched-mode power supply 300a, 300b. The primary-side control of the circuit breaker S3 and the feedback optocoupler OC1 usually have the negative input voltage $-V_{IN}$ as reference potential. This allows the power switch S3 to be controlled directly.

The optocoupler OC1 can also be implemented as an actual optocoupler as well as a magnetic coupler.

The switched-mode power supplies presented below include step-down converters with coupled step-down converter stages.

Figure 3C:
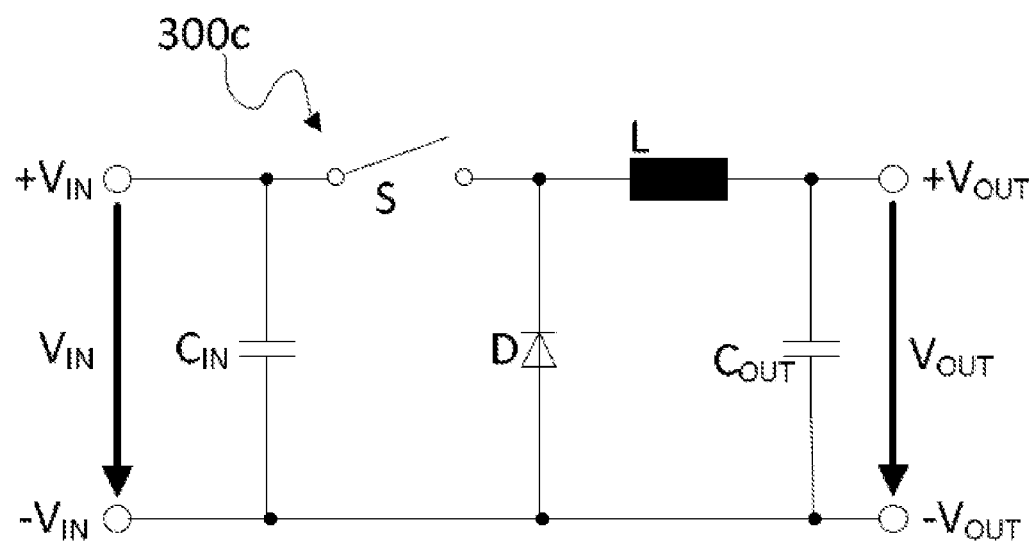

A step-down converter according to FIG. 3c or step-down converter, down converter or step-down regulator denotes a switching DC-DC converter in which the output voltage $V_{OUT}$ is always less than the amount of the input voltage $V_{IN}$.

The step-down converter comprises a switch S which is connected in series with a diode D between the positive $+V_{IN}$ and negative input voltage $-V_{IN}$. The switch S is also connected in series with a coil L between the positive input voltage $+V_{IN}$ and the positive output voltage $+V_{OUT}$. Furthermore, a capacitor C is connected between the positive $+V_{OUT}$ and the negative output voltage $-V_{OUT}$. The switch S (usually a transistor) is regularly switched on and off by a controller; usually a few hundred to several million switching cycles are carried out per second. As a result, electrical energy is transferred from the voltage source $V_{IN}$ connected on the input side to the load connected on the output side. The step-down converter comprises two energy storages, namely the coil L and the capacitor C, which enable the load to be supplied in the phases in which the switch is open. The inductance of the coil L keeps the higher input voltage away from the load. The output variable can be set by controlling the switch S on and off times. This control is usually done by a regulator in order to keep the output voltage or current at a desired value.

During the switch-on time, the load current flows through the coil and through the consumer; the diode D blocks. During the switch-off phase, the energy stored in the coil is dissipated: The current continues to flow through the consumer, but now through the diode D and from the capacitor C.

The coil L and the capacitor C form a second-order low-pass filter. The downward conversion is effectively achieved by filtering out the DC component from the square-wave voltage. How high this remaining DC component is can be set using the pulse duty factor.

Figure 4:
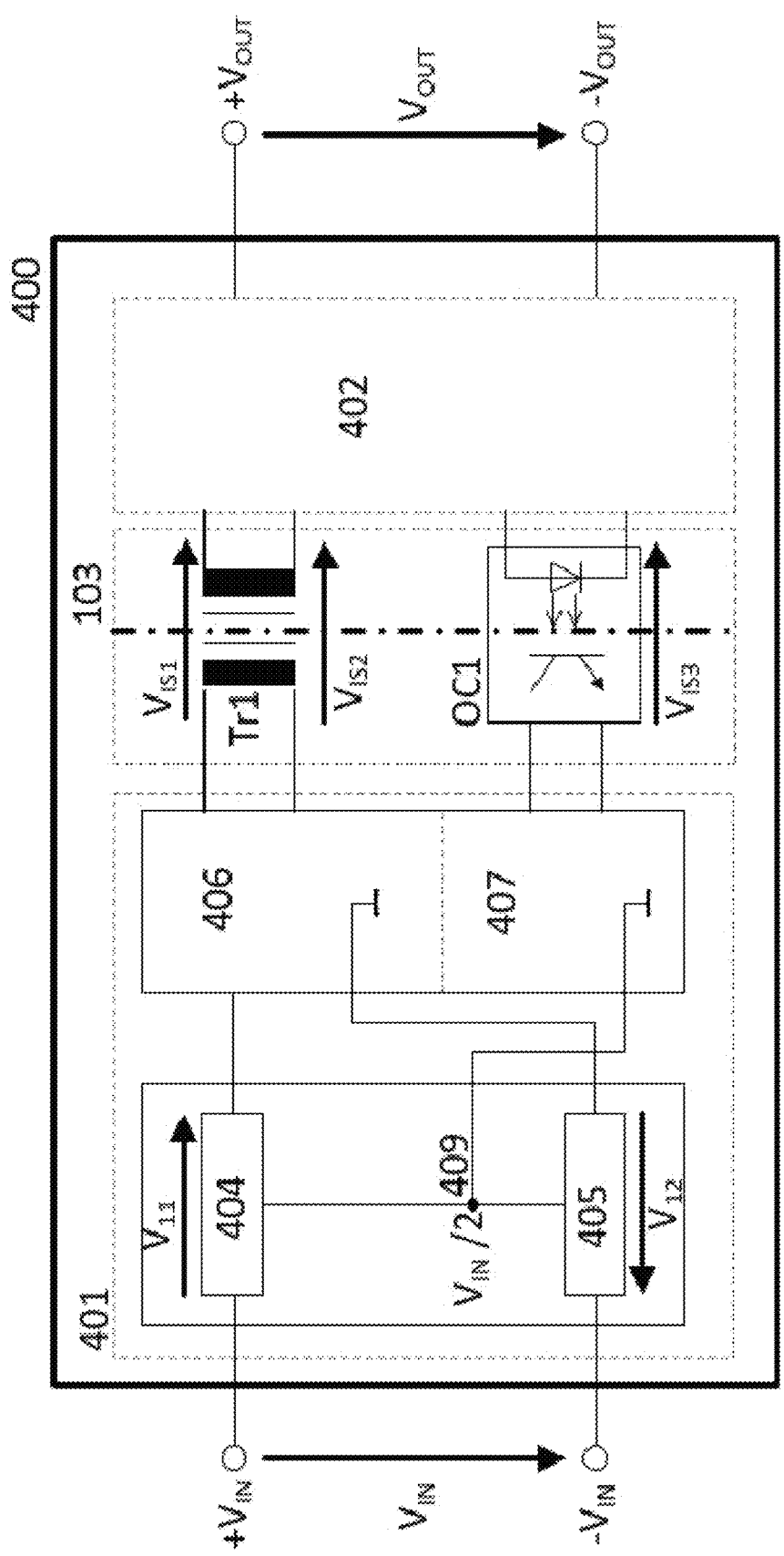
FIG. 4 shows a basic circuit diagram of a switched-mode power supply 400 with reduced insulation requirements according to an example of the principles of this disclosure.

FIG. 4 shows a basic circuit diagram of a switched-mode power supply 400 with reduced insulation requirements according to one example.

The switched-mode power supply 400 comprises an input circuit 401 powered by an input voltage $V_{IN}$; an output circuit 402 coupled to the input circuit 401 for providing an output voltage $V_{OUT}$; and a DC isolating element 103 between the input circuit 401 and the output circuit 402, which is designed to observe a prescribed safety requirement in regard to isolation between the input voltage $V_{IN}$ and the output voltage $V_{OUT}$. The input circuit 401 comprises two coupled step-down converter stages 403, of which a first step-down converter stage 404 in the positive input voltage $+V_{IN}$ and a second step-down converter stage 405 in the negative input voltage $-V_{IN}$ are connected upstream of the DC isolating element 103.

The two step-down converter stages 403 cause a voltage drop in the input voltage $V_{IN}$ and thus reduce an insulation voltage $V_{IS1}$, $V_{IS2}$, $V_{IS3}$ across the DC isolating element 103.

The DC isolating element 103 comprises a transformer Tr1, which decouples a power path 406 of the input circuit 401 from the output circuit 402 of the switched-mode power supply 400. The insulation voltages $V_{IS1}$ and $V_{IS2}$ drop across the transformer Tr1 between the input circuit 401 and the output circuit 402. The DC isolating element 103 further comprises an optocoupler OC1, which decouples a control 407 of the input circuit 401 from the output circuit 402 of the switched-mode power supply 400. The isolation voltage $V_{IS3}$ between input circuit 401 and output circuit 402 drops across optocoupler OC1.

A respective voltage drop of $V_{11}$ and $V_{12}$ results across the two step-down converter stages 404, 405 as a result of which the insulation voltage across the isolating distance $V_{IS1}$ is reduced regardless of the grounding. It is advantageous to combine or couple the coils of the two step-down converter stages 404, 405 and wind them on a ferrite core, whereby the two step-down converter stages 404, 405 automatically symmetrize and tolerances between the coils are irrelevant. Simultaneous activation of the power switches of the two step-down converters 404, 405 is necessary for this.

A reference potential of the control 407 of the input circuit 401 is connected to a center tap 409 between the two step-down converter stages 404, 405. This results in a division by half of the insulation voltage $V_{IS3}$ across the optocoupler OC1 to approximately half the input voltage $V_{IN}/2$.

Figure 5:
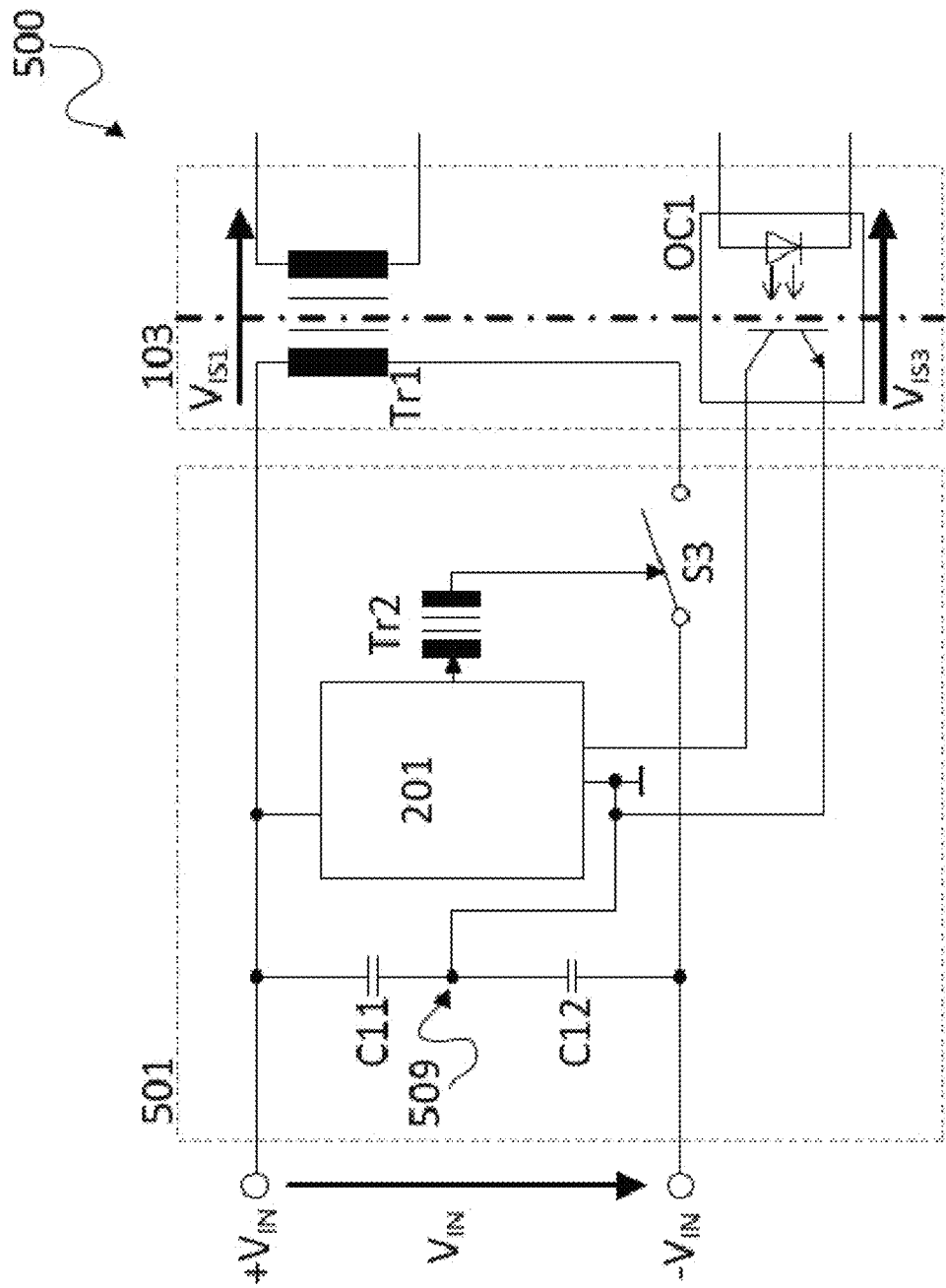
FIG. 5 shows a basic circuit diagram of a switched-mode power supply 500 with a lower voltage load on the optocoupler by changing the reference potential of the primary-side control according to an example of the principles of this disclosure.

FIG. 5 shows a basic circuit diagram of a switched-mode power supply 500 with a lower voltage load on the optocoupler by changing the reference potential of the primary-side control according to one example. The two step-down converter stages are not shown in the switched-mode power supply 500; it merely serves to simplify the illustration of the principle of changing the reference potential of the primary-side control.

The control of the input circuit 501 is connected to the midpoint 509 between the two step-down converter stages instead of the negative input voltage potential $-V_{IN}$, which corresponds to the center tap of the two input capacitors C11 and C12, whereby the input voltage $V_{IN}$ is divided by half to $V_{IN}/2$ and the insulation voltage $V_{IS3}$ is reduced to about half independent of the grounding.

Figure 6:
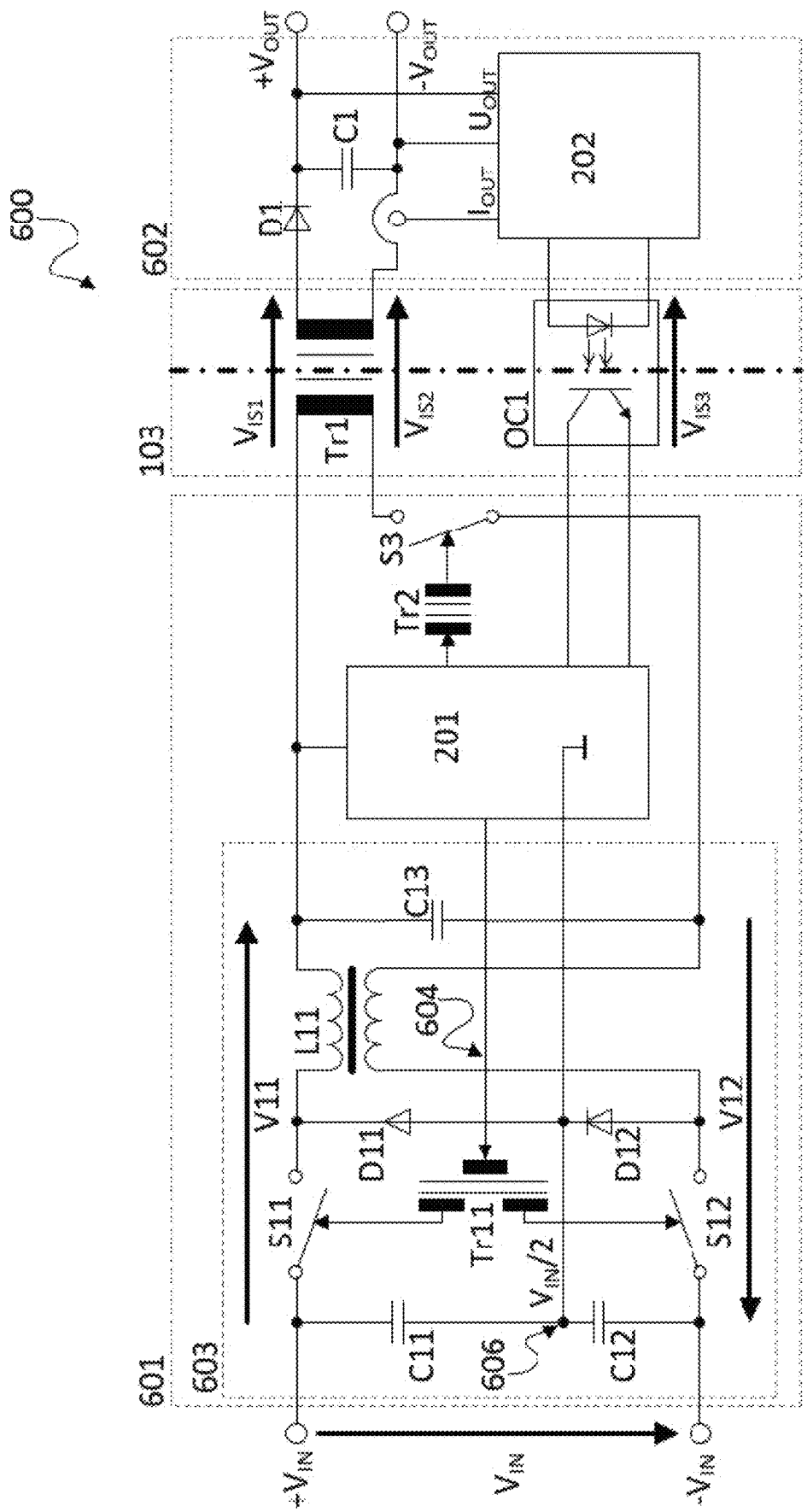
FIG. 6 shows a basic circuit diagram of a switched-mode power supply 600 with coupled step-down converter stages according to an example of the principles of this disclosure.

FIG. 6 shows a basic circuit diagram of a switched-mode power supply 600 with coupled step-down converter stages according to one example.

The switched-mode power supply 600 comprises an input circuit 601 powered by an input voltage $V_{IN}$; an output circuit 602 coupled to the input circuit 601 for providing an output voltage $V_{OUT}$; and a DC isolating element 103 between the input circuit 601 and the output circuit 602, which is designed to comply with a prescribed safety requirement with regard to isolation between the input voltage $V_{IN}$ and the output voltage $V_{OUT}$. The DC isolating element 103 corresponds to the DC isolating element 103 described for FIG. 4. The input circuit 601 comprises two coupled step-down converter stages 603, of which a first step-down converter stage in the positive input voltage $+V_{IN}$ and a second step-down converter stage in the negative input voltage $-V_{IN}$ are connected upstream of the DC isolating element 103.

The two step-down converter stages cause a voltage drop in the input voltage $V_{IN}$ and thus reduce an insulation voltage $V_{IS1}$, $V_{IS2}$, $V_{IS3}$ across the DC isolating element 103.

The two step-down converter stages 603 each include a coil L11, which are wound on a common core. The two step-down converter stages 603 each include a power switch S11, S12, a free-wheeling diode D11, D12 and the coils L11, which re coupled via the common core. The two step-down converter stages 603 can be controlled jointly via a control signal 604. The input circuit 601 comprises a pulse transformer Tr11 or, alternatively, a driver circuit (not shown) which are designed to adapt the control signal 604 of the two step-down converter stages 603 to a reference potential of the two power switches S11, S12.

The input circuit 601 comprises a control circuit 201 which is designed to generate the control signal 604. A reference potential 605 of the control circuit 201 is connected to a center tap 606 between the two step-down converter stages 603. The two step-down converter stages 603 are coupled to one another on the input side via two input capacitors C11, C12 connected in series, the center tap 606 of which forms the center tap 606 between the two step-down converter stages 603. The two input capacitors C11, C12 are connected in series between the positive input voltage $+V_{IN}$ and the negative input voltage $-V_{IN}$. The two step-down converter stages 603 are also coupled to one another on the output side via a single output capacitor C13.

The transformer Tr1 of the DC isolating element 103 can be controlled by the control circuit 201 via a circuit breaker S3.

The input circuit 601 comprises a transformer Tr2 connected between the control circuit 201 and the power switch S3 or a driver stage (not shown) which adapts the control circuit 201 to the reference potential of the power switch S3.

The DC isolating element 103 further comprises a feedback element OC1 for regulating the input circuit 601, which can be implemented as an optocoupler OC1 (as shown in FIG. 6) or as a magnetic coupler (not shown in FIG. 6). The feedback element can be controlled by the regulation 202 on the secondary side.

The switched-mode power supply 600 can be grounded at the positive input voltage $+V_{IN}$ or to the negative input voltage $-V_{IN}$.

FIG. 6 thus shows an example of a switched-mode power supply 600, which is preceded by two coupled step-down converter stages 603. The step-down converter stages 603 each consist of the circuit breaker S1 or S12 that can be switched on and off as required, the free-wheeling diode D11 or D12, which can also be any circuit breaker that can be switched on and off, and the coupled coil L11. Here, the output-side coils of the step-down converters 603 are wound onto a core. The step-down stages 603 are also activated with a signal. The control signal 604 can be adapted to the reference potential of the two power switches S1 and S12 via a pulse transformer Tr11. Adaptation via a driver circuit (not shown in FIG. 6) is also possible.

The common coil and control ensures that the voltage drop V11 and V12 across both step-down converter stages 603 is the same and the insulation requirements $V_{IS1}$ and $V_{IS2}$ across the transformer Tr1 are always reduced by the voltage drop V11 or V12, depending on the grounding on the input side. This also reduces the voltage load, in particular on the power semiconductors, for the downstream switched-mode power supply.

With input-side grounding at $+V_{IN}$, the insulation voltage $V_{IS3}$ across the feedback or optocoupler OC1 is the same as the maximum input voltage $V_{IN}$ when the primary-side control 201 or control is normally connected to $-V_{IN}$. By changing the reference of the primary-side control 201 to the center tap 606, $V_{IN}/2$ between the two step-down converters 603, the insulation voltage $V_{IS3}$ is divided by half to $V_{IN}/2$ when grounded at $+V_{IN}$.

The optocoupler OC1 can be implemented as an actual optocoupler as well as a magnetic coupler.

In the case of the switched-mode power supply 600 of FIG. 6, only one control signal 604 is required for both step-down converter circuits 603, which can be output to the power switches S11 and S12, for example via a pulse transformer Tr11 with two output windings.

One advantage of the switched-mode power supply 600 is the reduction in the subsequent insulation voltages across the DC isolating element 103.

The center point 606, VIN/2 of the two step-down circuits or step-down converter stages 603 can be used to reduce the isolation voltage, in particular for the regulation and the feedback optocoupler OC1.

Another advantage is that instead of two capacitors, only one capacitor C13 on the output side is used.

Likewise, if the switching times of the semiconductor switches actually differ somewhat, there is a greater tolerance. For example, if switch S11 is switched on first, the current flows through both coils of L11, C13 or Tr1, D12 and C12 to the mains connection. The doubled number of turns N results in a quadratic inductance, since $L=N^2*AL$. With the same capacitors, the time constant $t=L*C$ is quadrupled.

The principles of this disclosure are particularly suitable for use in a switched-mode power supply with a high input voltage of e.g. 1500 VDC with unknown grounding and thus very high insulation requirements.

Figure 7:
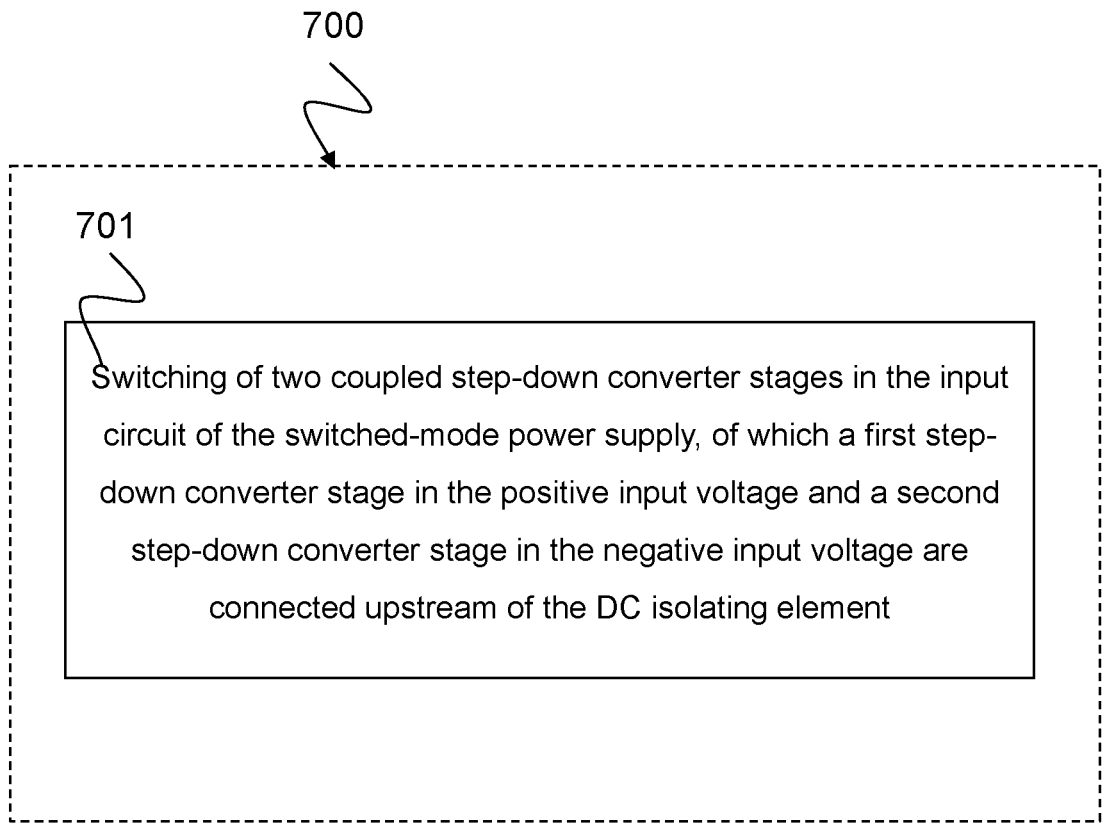
FIG. 7 shows a schematic illustration of a method 700 for reducing the insulation requirements for a switched-mode power supply according to an example of the principles of this disclosure.

FIG. 7 shows a schematic illustration of a method 700 for reducing the insulation requirements for a switched-mode power supply according to one example.

The switched-mode power supply can be a switched-mode power supply 400, 500, 600, as described above for FIGS. 4 to 6. In particular, the switched-mode power supply comprises an input circuit 401 powered by an input voltage $V_{IN}$; an output circuit 402 coupled to the input circuit 401 for providing an output voltage $V_{OUT}$; and a DC isolating element 103 between the input circuit 401 and the output circuit 402, wherein the isolating element is designed to observe a prescribed safety requirement with regard to isolation between the input voltage $V_{IN}$ and the output voltage $V_{OUT}$.

The method 700 comprises the following steps: Switching 701 two coupled step-down converter stages 403 in the input circuit 401 of the switched-mode power supply 400, 500, 600, of which a first step-down converter stage 404 in the positive input voltage $+V_{IN}$ and a second step-down converter stage 405 in the negative input voltage $-V_{IN}$ is connected upstream of the DC isolating element 103.

What is claimed is:

1. A switched-mode power supply, comprising:
   an input circuit powered by an input voltage, wherein the input voltage is based on a voltage difference between a positive input voltage and a negative input voltage;
   an output circuit coupled to the input circuit and configured to provide an output voltage; and
   a direct current (DC) isolating element between the input circuit and the output circuit and configured to observe a prescribed safety requirement with regard to isolation between the input voltage and the output voltage,
   wherein the input circuit comprises two coupled step-down converter stages, wherein the two coupled step-down converter stages comprise a first step-down converter stage configured to step down the positive input voltage and a second step-down converter stage configured to step down the negative input voltage, wherein the two coupled step-down converter stages are connected to the input circuit upstream of the DC isolating element,
   wherein the two coupled step-down converter stages are configured to cause a voltage drop in the input voltage and thus reduce an isolation voltage across the DC isolating element,
   wherein the two coupled step-down converter stages are coupled to one another on an output side via an output capacitor,
   wherein a coil of the first step-down converter stage and a coil of the second step-down converter stage are wound on and coupled via a common core,
   wherein the two coupled step-down converter stages are configured to be controlled jointly via a control signal,
   wherein the input circuit comprises a control circuit configured to generate the control signal, and
   wherein a reference potential of the control circuit is associated with a center tap between the two coupled step-down converter stages.

2. The switched-mode power supply according to claim 1, wherein the switched-mode power supply is grounded to the positive input voltage or to the negative input voltage.

3. The switched-mode power supply according to claim 1, wherein each of the two coupled step-down converter stages further comprises a power switch and a freewheeling diode.

4. The switched-mode power supply according to claim 3, wherein the input circuit comprises a pulse transformer or a driver circuit configured to adapt the control signal of the two coupled step-down converter stages to a reference potential of both power switches.

5. The switched-mode power supply according to claim 3, wherein the two coupled step-down converter stages are coupled to one another on an input side via two input capacitors connected in series, wherein a center tap of the two input capacitors forms the center tap between the two coupled step-down converter stages.

6. The switched-mode power supply according to claim 5, wherein the two input capacitors are connected in series between the positive input voltage and the negative input voltage.

7. The switched-mode power supply according to claim 3, wherein the DC isolating element comprises a transformer configured to be controlled by the control circuit via a second power switch.

8. The switched-mode power supply according to claim 7, wherein the input circuit comprises a second transformer connected between the control circuit and the power switch, wherein the second transformer galvanically isolates the control circuit from the power switch.

9. The switched-mode power supply according to claim 3, wherein the DC isolating element comprises a feedback element configured to regulate the input circuit, wherein the feedback element is configured to be controlled by a secondary-side regulator.

10. A method for reducing an insulation requirement on a switched-mode power supply, comprising:
    providing an input circuit powered by an input voltage, wherein the input voltage is based on a difference between a positive input voltage and a negative input voltage, an output circuit coupled to the input circuit and configured to provide an output voltage, and a DC isolating element between the input circuit and the output circuit, wherein the DC isolating element is configured to comply with a prescribed safety requirement with regard to isolation between the input voltage and the output voltage; and
    switching two coupled step-down converter stages in the input circuit of the switched-mode power supply,
    wherein the two coupled step-down converter stages comprise a first step-down converter stage in the positive input voltage and a second step-down converter stage in the negative input voltage, wherein the two coupled step-down converter stages are connected to the input circuit upstream of the DC isolating element,
    wherein the two coupled step-down converter stages are configured to cause a voltage drop in the input voltage and thus reduce an isolation voltage across the DC isolating element,
    wherein the two coupled step-down converter stages are coupled to one another on an output side via an output capacitor,
    wherein a coil of the first step-down converter stage and a coil of the second step-down converter stage are wound on and coupled via a common core,
    wherein the method further comprises controlling the two coupled step-down converter stages jointly via a common control signal,
    wherein the input circuit comprises a control circuit configured to generate the common control signal, and
    wherein a reference potential of the control circuit is associated with a center tap between the two coupled step-down converter stages.

11. The method of claim 10, further comprising:
    adapting a control signal of the two coupled step-down converter stages to a reference potential of respective power switches of the two coupled step-down converter stages.

12. The method of claim 11, wherein the two coupled step-down converter stages are coupled to one another on an input side via two input capacitors connected in series, wherein a center tap of the two input capacitors forms the center tap between the two coupled step-down converter stages.

* * * * *